US008903590B2

(12) United States Patent (10) Patent No.: US 8,903,590 B2
Jeon (45) Date of Patent: Dec. 2, 2014

(54) ROBOT CLEANER AND METHOD FOR CONTROLLING THE SAME

(75) Inventor: Hyeongshin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 13/509,004

(22) PCT Filed: Nov. 16, 2010

(86) PCT No.: PCT/KR2010/008098
§ 371 (c)(1),
(2), (4) Date: May 10, 2012

(87) PCT Pub. No.: WO2011/059296
PCT Pub. Date: May 19, 2011

(65) Prior Publication Data
US 2012/0221187 A1 Aug. 30, 2012

(30) Foreign Application Priority Data
Nov. 16, 2009 (KR) ........................ 10-2009-0110436

(51) Int. Cl.
G05D 1/02 (2006.01)
A47L 9/28 (2006.01)
B25J 9/16 (2006.01)
B25J 9/00 (2006.01)
A47L 9/00 (2006.01)

(52) U.S. Cl.
CPC ............... *A47L 9/009* (2013.01); *A47L 9/2868* (2013.01); *B25J 9/1676* (2013.01);
(Continued)

(58) Field of Classification Search
CPC ......... A47L 9/00; A47L 9/009; A47L 9/2857; A47L 9/2868; A47L 9/2878; A47L 9/2894; A47L 11/4011; A47L 11/4061; A47L 2201/00; A47L 2201/04; B25J 11/0085; B25J 13/089; B25J 9/00; G05D 1/00; G05D 1/0011; G05D 1/0088; G05D 1/0212; G05D 1/0231; G05D 1/0234; G05D 1/0238; G05D 1/0246; G05D 1/0274; G05D 2201/0215; Y10S 901/47; G05B 2219/31007
USPC ........................ 701/25, 26, 28, 300, 301, 532
See application file for complete search history.

(56) References Cited

U.S. PATENT DOCUMENTS

2002/0153184 A1* 10/2002 Song et al. .................... 180/167
2004/0096083 A1* 5/2004 Matsunaga et al. ........... 382/104
(Continued)

FOREIGN PATENT DOCUMENTS

JP 2006-247229 A 9/2006
JP 2008-129614 A 6/2008
(Continued)

OTHER PUBLICATIONS

International Search Report dated Aug. 25, 2011 issued in Application No. PCT/KR2010/008098.
(Continued)

Primary Examiner — Jerrah Edwards
(74) Attorney, Agent, or Firm — Ked & Associates, LLP

(57) ABSTRACT

The present description relates to a robot cleaner and to a method for controlling the same, which involve generating a map of an area to be cleaned in accordance with a travel mode command, and performing a cleaning operation by avoiding obstacles on the basis of the generated map upon receipt of a cleaning mode command. For this purpose, the robot cleaner of the present invention comprises: a travel unit which travels around the area to be cleaned upon receipt of the travel mode command; a detection unit which detects an object located in the area to be cleaned during travel performed in accordance with the travel mode command; and a control unit which generates a map of an area to be cleaned on the basis of the information on the location of an obstacle, if the detected object is the obstacle, and controls a cleaning operation on the basis of the generated map upon receipt of a cleaning mode command.

9 Claims, 3 Drawing Sheets

(52) U.S. Cl.
CPC ... *G05B 2219/31007* (2013.01); *A47L 2201/04* (2013.01); *A47L 9/2857* (2013.01); *B25J 9/0003* (2013.01); *G05D 2201/0203* (2013.01); *G05D 1/0238* (2013.01); *A47L 9/2894* (2013.01); *G05D 1/0274* (2013.01)
USPC .......... 701/25; 701/26; 701/28; 701/532; 701/300; 701/301

(56) References Cited

U.S. PATENT DOCUMENTS

| | | | |
|---|---|---|---|
| 2004/0168148 A1* | 8/2004 | Goncalves et al. | 717/104 |
| 2007/0267570 A1 | 11/2007 | Park et al. | |
| 2009/0048727 A1* | 2/2009 | Hong et al. | 701/26 |

FOREIGN PATENT DOCUMENTS

| | | |
|---|---|---|
| KR | 10-0466321 B1 | 1/2005 |
| KR | 10-2009-0018562 A | 2/2009 |
| WO | WO 03/039314 A2 | 5/2003 |
| WO | WO 2004/082899 A2 | 9/2004 |

OTHER PUBLICATIONS

European Search Report issued in Appln No. 10830228.2-1712 dated Feb. 7, 2014.

* cited by examiner

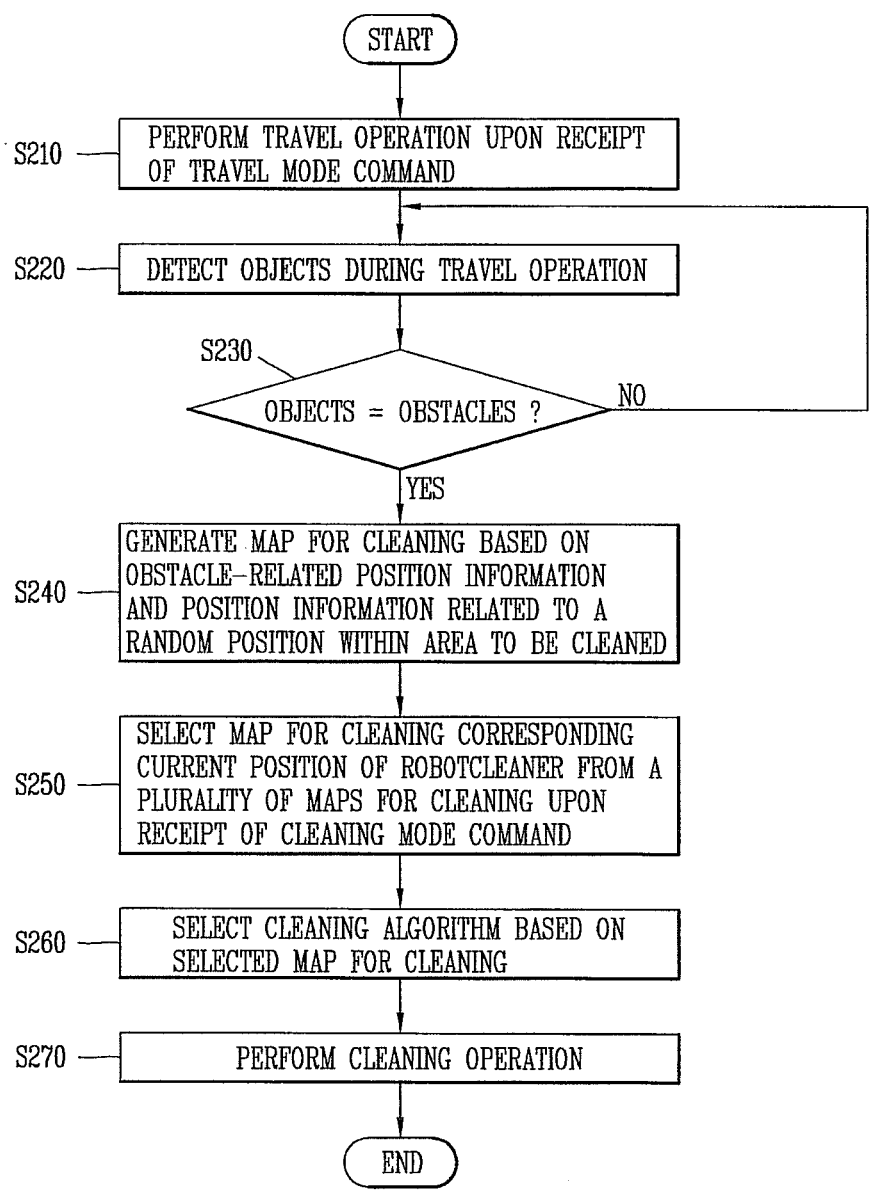

ROBOT CLEANER AND METHOD FOR CONTROLLING THE SAME

TECHNICAL FIELD

The present disclosure relates to a robot cleaner and a method for controlling the same.

BACKGROUND ART

Generally, a robot has been developed for an industrial use, and has managed some parts of factory automation. As the robot is applied to various fields recently, medical robots, space robots, home robots used at homes, etc. are being developed.

A representative of the home robots is a robot cleaner, a kind of home electronic appliance capable of performing a cleaning operation by sucking peripheral dust particles or foreign materials with autonomously moving on a predetermined region.

Also, the robot cleaner is provided with a rechargeable battery so as to travel by itself to clean a random space.

DISCLOSURE OF THE INVENTION

An aspect of the detailed description is to provide a robot cleaner capable of accurately searching ambient environments of an area to be cleaned according to a travel mode command.

Another aspect of the detailed description is to provide a robot cleaner capable of generating a map for cleaning based on position information on obstacles existing within an area to be cleaned and/or position information along a travel path according to a travel mode command, and a method for controlling the same.

Another aspect of the detailed description is to provide a robot cleaner capable of performing a cleaning operation, according to a cleaning mode command, along an optimized travel path for avoiding obstacles based on a map for cleaning generated, and a method for controlling the same.

To achieve these and other advantages and in accordance with the purpose of the present invention, as embodied and broadly described herein, there is provided a robot cleaner including a travel unit to travel in an area to be cleaned upon receipt of a travel mode command is received, a detection unit to detect objects located within the area to be cleaned while traveling according to the travel mode command, and a control unit to generate a map for cleaning with respect to the area to be cleaned based on position information related to obstacles when the detected objects are the obstacles, the control unit controlling a cleaning operation based on the generated map for cleaning upon receipt of a cleaning mode command.

To achieve these and other advantages and in accordance with the purpose of the present invention, as embodied and broadly described herein, there is provided a method for controlling a robot cleaner including generating a map for cleaning with respect to an area to be cleaned upon receipt of a travel mode command, and controlling a cleaning operation based on the generated map for cleaning upon receipt of a cleaning mode command.

To achieve those aspect of the present disclosure in accordance with one exemplary embodiment, a robot cleaner may include a travel unit to travel in an area to be cleaned upon receipt of a travel mode command, a detection unit to detect objects located within the area to be cleaned while traveling according to the travel mode command, and a control unit to generate a map for cleaning with respect to the area to be cleaned based on position information related to obstacles and position information along a travel path when the detected objects are the obstacles.

In accordance with another exemplary embodiment of the present disclosure, a method for controlling a robot cleaner may include generating a map for cleaning with respect to an area to be cleaned based on position information related to obstacles and position information along a travel path upon receipt of a travel mode command, and controlling a cleaning operation based on the generated map for cleaning upon receipt of a cleaning mode command.

ADVANTAGEOUS EFFECT

In accordance with a robot cleaner and a method for controlling the same according to exemplary embodiments of the present disclosure, ambient environments of an area to be cleaned can be searched accurately according to a travel mode command, which allows a map for cleaning to be accurately and efficiently generated.

In accordance with a robot cleaner and a method for controlling the same according to exemplary embodiments of the present disclosure, a map for cleaning may be generated based on position information related to obstacles existing in an area to be command and position information along a travel path according to a travel mode command, which may result in accurate and efficient recognition of a spatial characteristic of an area to be cleaned.

Also, in accordance with a robot cleaner and a method for controlling the same according to exemplary embodiments of the present disclosure, a cleaning operation can be carried out along an optimized travel path for avoiding obstacles based on a map for cleaning generated according to a cleaning mode command, which may result in efficient performance of the cleaning operation.

BRIEF DESCRIPTION OF THE DRAWINGS

FIG. 4 is a flowchart showing a method for controlling a robot cleaner in accordance with a second exemplary embodiment.

MODES FOR CARRYING OUT THE PREFERRED EMBODIMENTS

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Figure 1:
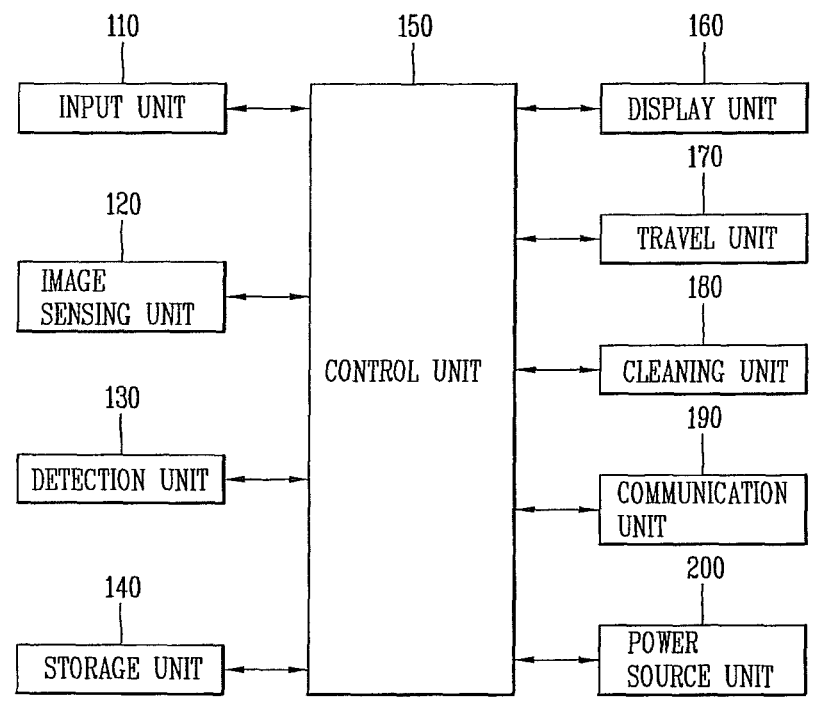
FIG. 1 is a block diagram showing a configuration of a robot cleaner in accordance with one exemplary embodiment.

FIG. 1 is a block diagram showing a configuration of a robot cleaner in accordance with one exemplary embodiment. As shown in FIG. 1, a robot cleaner 10 may include an input unit 110, an image sensing unit 120, a detection unit 130, a storage unit 140, a control unit 150, a display unit 160, a travel unit 170, a cleaning unit 180, a communication unit 190, and a power source unit 200.

The input unit 110 may receive a signal in response to a user's button manipulation, or a command or control signal generated by a manipulation, such as touching/scrolling a screen displayed.

Also, the input unit 110 may receive a signal corresponding to information input by the user. Examples of the input unit 110 may include various devices, such as a keyboard, a keypad, a dome switch, a touchpad (e.g., static pressure/capacitance), a touch screen, a jog shuttle, a jog wheel, a jog switch, a mouse, a stylus pen, a touch pen, a laser pointer and the like. Here, the input unit 110 may receive a signal corresponding to an input by such various devices.

The input unit 110 may include a button for receiving a travel mode command (or a travel mode button), a button for receiving a cleaning mode command (or a cleaning mode button), a button for receiving an image information capture command (or a capture button), a button for receiving a stop command (or a stop button), and the like.

The image sensing unit 120 may capture image information under the control of the control unit 150.

Figure 2:
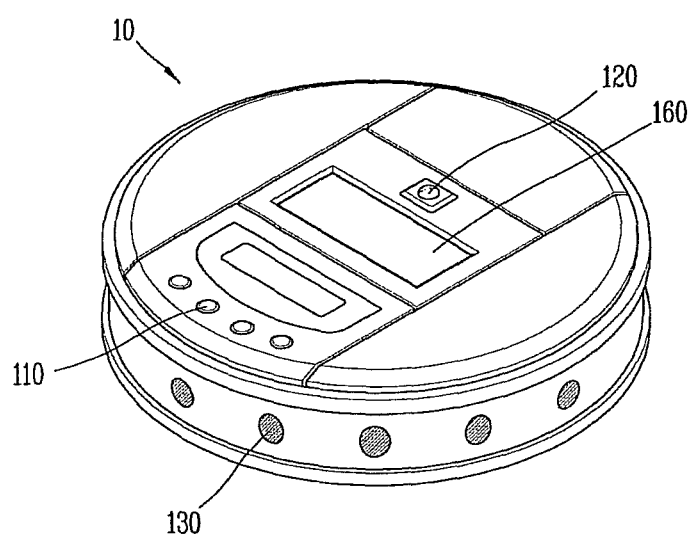
FIG. 2 is a view showing the robot cleaner in accordance with the one exemplary embodiment.

The image sensing unit 120, as shown in FIG. 2, may include at least one camera which is disposed at a top of the robot cleaner 10 to capture an upper side, which is perpendicular to a travel direction of the robot cleaner 10. That is, the image sensing unit 120 may include an image sensor, such as a camera capable of capturing the upper side, to generate image information related to the upper side. The image sensing unit 120 may then process objects installed on a ceiling or wall surface into images based on the top image information and output the processed image.

The image sensing unit 120 may also include at least one camera installed at a front surface (or a side surface) of the robot cleaner 10 to capture a front side (or a lateral side). The image sensing unit 120 may alternatively include at least one camera at both top and bottom of the robot cleaner 10.

The detection unit 130 may be disposed at a side surface of the robot cleaner 10 to sense (or detect) an object (or obstacle) located within an area to be treated (or an area to be cleaned), which includes a specific area.

The detection unit 130 may be implemented as a distance sensor, such as a supersonic sensor, an infrared sensor and a Radio Frequency (RF) sensor, which receives a signal in response to a signal sent thereby to detect a position of an obstacle and a distance from the obstacle, an impact sensor to sense an obstacle in response to an impact against the obstacle.

The detection unit 130 may also detect an object (or obstacle) located within the area to be cleaned based on a control signal generated by the control unit 150 upon receipt of a travel mode command.

The detection unit 130 may detect an object existing in the area to be cleaned when a cleaning operation is carried out in response to receipt of a cleaning mode command.

The storage unit 140 may store various types of information, such as various menu screens, a plurality of cleaning algorithms, maps for cleaning and the like.

The storage unit 140 may also store various User Interfaces (UIs) and/or Graphic User Interfaces (GUIs).

The storage unit 140 may also store data and programs required for operation of the robot cleaner 10.

The storage unit 140 may store information related to travel paths of the robot cleaner 10, a cleaning algorithm used for each path and the like.

The storage unit 140 may store various types of information (including map data, cleaning algorithm, various control signals, etc.), which are received via the communication unit 190.

The control unit 150 may perform an overall control function for the robot cleaner 10.

The control unit 150 may generate a control signal for controlling the robot cleaner to travel within the area to be cleaned and control the travel unit 170 based on the generated control signal upon receipt of a travel mode command (or when the travel mode button is selected).

The control unit 150 may receive a signal sent by an external beacon, and check a position of the robot cleaner 10 based on the received signal.

The control unit 150 may determine whether or not objects, which are include in the image information output by the image sensing unit 120, are obstacles. When it is determined as the obstacles, the control unit 150 may check position information related to the obstacles.

The control unit 150 may determine whether or not objects detected by the detection unit 130 are obstacles, and if they are determined as the obstacles, check position information related to the obstacles.

The control unit 150 may generate a map for cleaning based on position information related to the obstacles located within the area to be cleaned, and store the generated map for cleaning in the storage unit 140. Here, the map for cleaning may include position information related to obstacles (or position information related to obstacles matched onto the map for cleaning), position information along a travel path in response to movement of the robot cleaner 10, and the like.

The control unit 150 may select at least one cleaning algorithm from a plurality of cleaning algorithms pre-stored in the storage unit 140 upon receipt of the cleaning mode command (or when the cleaning mode button is selected). Also, the control unit 1509 may control the travel unit 170 and the cleaning unit 180 to perform a cleaning operation based on the selected cleaning algorithm and the generated map for cleaning (including the obstacle-related position information).

When a random object (including an obstacle) is detected by the detection unit 130 during control of the cleaning operation, if the detected object is determined as an obstacle, the control unit 150 may control the travel unit 170 to avoid the corresponding object.

The control unit 150 may control the display unit 160 to display various information related to the robot cleaner, which includes a button input state of the input unit 110 or the display unit 160, an operating state of the robot cleaner 10, and the like.

When the robot cleaner 10 performs a cleaning operation, the control unit 150 may update the position information related to the robot cleaner 10 according to the travel path into the map for cleaning. That is, when the robot cleaner 10 performs a cleaning operation based on the generated map for cleaning, the control unit 150 may divide an area into a pre-cleaned area which has been cleaned and a non-cleaned area which has not been cleaned. The map for cleaning may include the pre-cleaned area and the non-cleaned area.

The control unit 150 may select a map for cleaning corresponding to a current position of the robot cleaner 10 from a plurality of maps for cleaning (including the obstacle-related position information) pre-stored in the storage unit 140 upon receipt of the cleaning mode command. Also, the control unit 150 may control the travel unit 170 and the cleaning unit 180 to perform the cleaning operation based on the selected map for cleaning and the cleaning algorithm selected from the plurality of cleaning algorithms pre-stored in the storage unit 140.

The display unit 160 may be installed on an upper surface of a side surface of the robot cleaner 10, and display various information generated by the control unit 150. The display unit 160 may include at least one of Liquid Crystal Display (LCD), a Thin Film Transistor-Liquid Crystal Display (TFT LCD), Organic Light-Emitting Diode (OLED), flexible display, Field Emission Display (FED) and 3D display.

Among them, the display unit 160 may be implemented as a transparent type or a light-transmissive type such that an outside can be viewed therethrough (or, an inside of the robot cleaner 10 can be viewed). This is called a transparent display. A representative of the transparent display may be a Transparent OLED (TOLED) or the like.

Two or more display units 160 may be disposed according to a configuration of the robot cleaner 10. For example, a plurality of display units may be disposed on one surface (the same surface) of the robot cleaner 10 integrally with each other or by a spaced distance therebetween, or be disposed on different surfaces of the robot cleaner 10.

When the display unit 160 and a touch-sensitive sensor (hereinafter, referred to as 'touch sensor') form a layered structure with each other (hereinafter, referred to as 'touch screen'), the display unit 160 may be used as an input device as well as an output device. The touch sensor may have a form of a touch film, a touch sheet, a touch pad and the like, for example.

The touch sensor may convert pressure applied onto a specific portion of the display unit 160 or a change in capacitance generated on a specific portion of the display unit 160 into an electrical input signal. The touch sensor may sense even touch pressure as well as touch position and touch area. When the touch sensor senses a touch input, a signal(s) corresponding to the touch input is sent to a touch controller (not shown). The touch controller processes the signal(s) and then sends corresponding data to the control unit 150. Accordingly, the control unit 150 may recognize which area of the display unit 160 has been touched.

The display unit 160 may display various contents using UI and/or GUI stored in the storage unit 140 upon displaying the various information generated by the control unit 150. Here, the contents displayed on the display unit 160 may include a menu screen, which includes various text or image data, data of icon, list menu and combo box and the like.

The robot cleaner 10 may further include an audio output unit (not shown) for outputting audio information included in the various information generated by the control unit 150. Here, the audio output unit may be a speaker.

The travel unit 170 may include at least one wheel, and a driving unit such as a motor or the like may drive the at least one wheel.

The travel unit 170 may perform travel operations, such as move, stop, change direction, and the like, under the control of the control unit 150.

The travel unit 170 may be connected with sensors, for example, an encoder.

When a travel mode command is received, the travel unit 170 may perform a travel operation with respect to the area to be cleaned based on a control signal generated by the control unit 150.

When a cleaning mode command is received, the travel unit 170 may perform a travel operation with respect to the area to be cleaned based on a control signal generated by the control unit 150.

The cleaning unit 180 may be disposed at a lower surface of the robot cleaner 10, and suck up foreign materials located under the robot cleaner by the control of the control unit 150 while the robot cleaner 10 travels or stops, thereby performing the cleaning operation.

The cleaning unit 180 may also include an air conditioning element for purifying contaminated materials in the air.

The communication unit 190 may perform an interconnection with an external terminal, such as a remote controller, a mobile terminal, an information providing center and the like, via wired/wireless communication. Here, Examples of wireless Internet technologies may include Wireless LAN (WLAN), Wi-Fi, Wireless Broadband (Wibro), World Interoperability for Microwave Access (Wimax), High Speed Downlink Packet Access (HSDPA), IEEE 802.16, Long Term Evolution (LTE), Wireless Mobile Broadband Service (WMBS), and the like. Also, Suitable short-range technologies may include BLUETOOTH, Radio Frequency IDentification (RFID), Infrared Data Association (IrDA), Ultra-WideBand (UWB), ZigBee, and the like.

Also, the communication unit 190 may receive various information (including a control signal, a cleaning map information, etc.) sent from the external terminal.

The power source unit 200 may store (or be charged with) power supplied from an external power supply unit.

The power source unit 200 may supply the power to each component configuring the robot cleaner 10.

The power source unit 200 may include a battery as a single element, or a plurality of batteries as one pack (battery pack).

When the power source unit 200 includes the plurality of batteries, the plurality of batteries may be connected in series, and at least one safety switch may be interposed between the batteries.

The power source unit 200 may obtain power by a wired/wireless charging method with the external power supply unit. That is, the power source unit 200 may be directly connected to the external power supply unit via a component such as a power outlet. Alternatively, the power source unit 200 and the external power supply unit may include transmitter/receiver, respectively. Accordingly, the power source unit 200 may be recharged by using a magnetic resonance coupling method, an electromagnetic induction method and a radiowave method between the transmitter and the receiver. That is, the power source unit 200 and the external power supply unit may be configured to be wirelessly rechargeable. Upon the wireless recharging, the configurations of the transmitter and the receiver may be easily designed by a skilled person in the art, and their functions can be performed.

As such, a map for cleaning can be generated, according to a travel mode command, on the basis of obstacle-related position information with respect to an area to be cleaned and/or position information along a travel path.

Also, when a cleaning mode command is received after the map for cleaning has been previously generated, the cleaning operation can be performed using an optimized path for avoiding obstacles based on the generated map for cleaning.

Hereinafter, a method for controlling a robot cleaner will be described in detail with reference to FIGS. 1 to 4.

Figure 3:
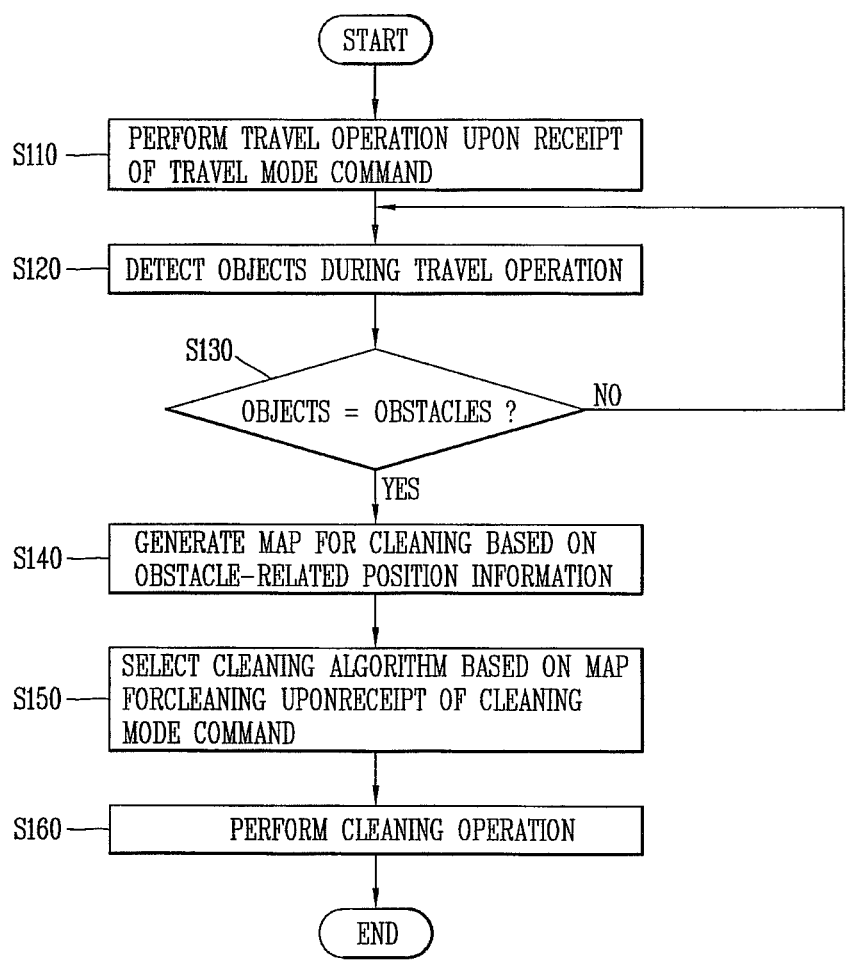
FIG. 3 is a flowchart showing a method for controlling a robot cleaner in accordance with a first exemplary embodiment.

FIG. 3 is a flowchart showing a method for controlling a robot cleaner in accordance with a first exemplary embodiment.

First, the travel unit 170 performs a travel operation of the robot cleaner 10 based on a control signal generated by the control unit 150 when a travel mode button disposed on the input unit 110 or the display unit 160 is selected (or a travel mode command is received). Here, the travel unit 170 performs a travel operation, such as moving forward in a predetermined direction or rotating in an area to be cleaned. The travel unit 170 stores initial position information related to a travel start point in the storage unit 140 under the control of the control unit 150, travels around the area to be cleaned, and finally rotates back to the initial position (S110).

Afterwards, the detection unit 130 detects objects located in the area to be cleaned while the robot cleaner 10 travels according to the travel mode command.

Also, while the robot cleaner 10 travels according to the travel mode command, the image sensing unit 120, which is disposed at one side surface (upper surface or side surface) of the robot cleaner 10, captures an upper side or a front side (or lateral side), and senses objects included in the captured upper or front image information (S120).

The control unit 150 determines whether or not the objects, which are included in the image information (including upper/front image information) output by the image sensing unit 120, or objects detected by the detection unit 130 are obstacles (S130).

If it is determined that the objects are obstacles, the control unit 150 generates a map for cleaning including position information related to the obstacles.

Also, the control unit 150 may store the generated map for cleaning in the storage unit 140 or display the map on the display unit 160 (S140).

After generating the map for cleaning including the position information related to the obstacles within the area to be cleaned, when a travel mode button disposed on the input unit 110 or the display unit 160 is selected (or a cleaning mode command is received), the control unit 150 selects at least one cleaning algorithm from a plurality of cleaning algorithm, which are pre-stored in the storage unit 140, on the basis of the generated map for cleaning including the obstacle-related position information.

As one example, after receipt of the cleaning mode command, when it is determined that there are present obstacles more than a preset number in the generated map for cleaning, the control unit 150 selects a cleaning algorithm optimized for avoiding obstacles, or a random cleaning algorithm optimized to the generated map for cleaning (S150).

The control unit 150 then generates a control signal for controlling travel and/or cleaning operation of the robot cleaner 10 on the basis of the selected at least one cleaning algorithm and the generated map for cleaning. Afterwards, the control unit 150 controls the travel unit 170 and/or the cleaning unit 180 to perform the cleaning operation based on the generated control signal.

That is, the control unit 150 controls the travel unit 170 and/or the cleaning unit 180 to perform the cleaning operation based on the selected at least one cleaning algorithm and the generated map for cleaning.

As one example, the control unit 150 may check positions of obstacles based on the generated map for cleaning and perform a cleaning operation along an optimized travel path for performing the cleaning operation with avoiding the obstacles.

Also, during cleaning performed, the control unit 150 updates information, which are related to a pre-cleaned area which has been cleaned along the travel path of the robot cleaner 10, a non-cleaned area which has not been cleaned, and the like, in the map for cleaning, and displays the updated map for cleaning on the display unit 160 (S160).

FIG. 4 is a flowchart showing a method for controlling a robot cleaner in accordance with a second exemplary embodiment.

First, the travel unit 170 performs a travel operation of the robot cleaner 10 based on a control signal generated by the control unit 150 when a travel mode button disposed on the input unit 110 or the display unit 160 is selected (or a travel mode command is received). Here, the travel unit 170 performs a travel operation, such as moving forward in a predetermined direction or rotating in an area to be cleaned. The travel unit 170 stores initial position information related to a travel start point in the storage unit 140 under the control of the control unit 150, travels around the area to be cleaned, and finally rotates back to the initial position (S210).

Afterwards, the detection unit 130 detects objects located in the area to be cleaned while the robot cleaner 10 travels according to the travel mode command.

Also, while the robot cleaner 10 travels according to the travel mode command, the image sensing unit 120 which is disposed at one side surface (upper surface or side surface) of the robot cleaner 10 captures an image of an upper side or a front side (or lateral size), and senses objects included in the captured upper or front image information (S220).

The control unit 150 determines whether or not the objects, which are included in the image information (including upper/front image information) output by the image sensing unit 120, or the objects detected by the detection unit 130 are obstacles (S230).

If it is determined that the objects are obstacles, the control unit 150 generates a map for cleaning, which includes position information related to the obstacles, position information along a travel path of the robot cleaner 10, and the like.

Also, the control unit 150 may store the generated map for cleaning in the storage unit 140 or display the map on the display unit 160 (S240).

Afterwards, when a travel mode button disposed on the input unit 110 or the display unit 160 is selected (or a cleaning mode command is received), the control unit 150 selects a map for cleaning corresponding to a current position of the robot cleaner 10 from a plurality of maps for cleaning pre-stored in the storage unit 140. Here, each of the plurality of maps for cleaning pre-stored may include position information related to the obstacles and/or position information along a travel path.

As one example, when the cleaning mode command is received, the control unit 150 checks a current position of the robot cleaner 10 from the plurality of maps pre-stored, the control unit 150 selects a cleaning algorithm optimized for avoiding obstacles or a random cleaning algorithm optimized to the generated map for cleaning from the plurality of cleaning algorithms pre-stored (S260).

Afterwards, the control unit 150 generates a control signal for controlling a travel and/or cleaning operation of the robot cleaner 10 on the basis of the selected at least one cleaning algorithm and the selected map for cleaning. The control unit 150 then controls the travel unit 170 and/or the cleaning unit 180 to perform a cleaning operation according to the generated control signal.

That is, the control unit 150 controls the travel unit 170 and/or the cleaning unit 180 to perform the cleaning operation according to the selected at least one cleaning algorithm and the selected map for cleaning.

As one example, the control unit 150 may check positions of the obstacles based on the generated map for cleaning to perform the cleaning operation along an optimized travel path for performing the cleaning operation with avoiding the obstacles.

Also, during the cleaning operation, the control unit 150 may update information, which are related to a pre-cleaned area which has been cleaned along the travel path of the robot cleaner 10, a non-cleaned area which has not been cleaned, and the like, into the map for cleaning, and then display the updated map for cleaning on the display unit 160 (S270).

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A robot cleaner comprising:
   a travel unit to travel in an area to be cleaned upon receipt of a travel mode command;
   a detection unit disposed at a side surface of the robot cleaner to detect objects located within the area to be cleaned while traveling according to the travel mode command; and
   a cleaning unit to perform a cleaning operation;
   a control unit to control the travel unit and the detection unit while not performing the cleaning operation according to the travel mode command, thereby generating a map for cleaning with respect to the area to be cleaned based on position information related to obstacles when the detected objects are the obstacles, and to control the cleaning unit based on the generated map for cleaning upon receipt of a cleaning mode command after the generating the map for cleaning,
   wherein the control unit selects a map for cleaning corresponding to a current position of the robot cleaner from a plurality of maps for cleaning, each including position information related to obstacles and position information along a travel path, and controls the cleaning operation by a determined first cleaning algorithm based on the selected map for cleaning, upon receipt of the cleaning mode command.

2. The robot cleaner of claim 1, further comprising:
   an image sensing unit to capture image information related to a travel path for output during traveling according to the travel mode command.

3. The robot cleaner of claim 2, wherein the control unit determines whether or not the objects detected by the detection unit or objects included in the image information output by the image sensing unit are obstacles, and when the objects are determined as obstacles, stores position information related to the obstacles by matching onto the map for cleaning.

4. The robot cleaner of claim 1, wherein the control unit controls the cleaning operation to be performed by avoiding the obstacles based on the position information related to the obstacles included in the generated map for cleaning.

5. The robot cleaner of claim 1, wherein the control unit determines a second cleaning algorithm according to a number of the obstacles in the selected map for cleaning after receipt of the cleaning mode command, and controls the cleaning unit to perform the cleaning operation based on the determined second cleaning algorithm.

6. A method for controlling a robot cleaner comprising:
   controlling the robot cleaner to travel in an area to be cleaned upon receipt of a travel mode command by a travel unit;
   detecting objects located within the area to be cleaned during traveling of the robot cleaner by a detection unit, wherein the detection unit is disposed at a side surface of the robot cleaner;
   generating a map for cleaning with respect to the area to be cleaned based on position information related to obstacles when the detected objects are the obstacles, through controlling the travel unit and the detection unit while not performing a cleaning operation, according to the travel mode command by a control unit; and
   controlling a cleaning unit to perform the cleaning operation based on the generated map for cleaning upon receipt of a cleaning mode command after the generating the map of cleaning,
   wherein the controlling of the cleaning operation unit comprises:
      checking a current position of the robot cleaner upon receipt of the cleaning mode command;
      selecting a map for cleaning corresponding to the current position of the robot cleaner from a plurality of maps for cleaning pre-stored, each map including position information related to obstacles and position information along a travel path;
      performing a cleaning operation using a cleaning unit included in the robot cleaner by a determined first cleaning algorithm based on the selected map for cleaning; and
      performing the cleaning operation with avoiding the obstacles based on the position information related to the obstacles included in the map for cleaning while performing the cleaning operation.

7. The method of claim 6, wherein the controlling the cleaning unit comprises:
   performing the cleaning operation with avoiding the obstacles based on the position information related to the obstacles included in the map for cleaning during the cleaning operation.

8. The method of claim 6, wherein the generating the map for cleaning with respect to the area to be cleaned based on position information related to obstacles and position information along a travel path upon receipt of a travel mode command.

9. The method of claim 6, wherein the controlling the cleaning unit further comprises:
   determining a second cleaning algorithm according to a number of the obstacles in the selected map for cleaning after receipt of the cleaning mode command; and
   controlling the cleaning unit to perform the cleaning operation based on the determined second cleaning algorithm.

* * * * *